United States Patent
Nakata (10) Patent No.: US 12,250,608 B2
(45) Date of Patent: Mar. 11, 2025

(54) COMMUNICATION DEVICE AND COMMUNICATION METHOD

(71) Applicant: DENSO CORPORATION, Kariya (JP)

(72) Inventor: Tsuneo Nakata, Kariya (JP)

(73) Assignee: DENSO CORPORATION, Kariya (JP)

( * ) Notice: Subject to any disclaimer, the term of this patent is extended or adjusted under 35 U.S.C. 154(b) by 422 days.

(21) Appl. No.: 17/873,205

(22) Filed: Jul. 26, 2022

(65) Prior Publication Data
US 2023/0037002 A1 Feb. 2, 2023

(30) Foreign Application Priority Data
Jul. 28, 2021 (JP) ................................ 2021-123357

(51) Int. Cl.
*H04W 36/00* (2009.01)
*H04W 36/24* (2009.01)
*H04W 36/32* (2009.01)
*H04W 36/14* (2009.01)

(52) U.S. Cl.
CPC ........... *H04W 36/32* (2013.01); *H04W 36/24* (2013.01); *H04W 36/144* (2023.05)

(58) Field of Classification Search
CPC .... H04W 36/144; H04W 36/24; H04W 36/32
See application file for complete search history.

(56) References Cited

U.S. PATENT DOCUMENTS

| | | | | |
|---|---|---|---|---|
| 5,987,327 A | * | 11/1999 | Lev | ..................... H04W 88/181 455/445 |
| 2012/0010768 A1 | * | 1/2012 | Phillips | ................... B60L 50/61 180/65.21 |
| 2019/0253948 A1 | | 8/2019 | Nagura et al. | |
| 2021/0114616 A1 | * | 4/2021 | Altman | ................. H04W 76/15 |

FOREIGN PATENT DOCUMENTS

JP 2019-140563 A 8/2019

* cited by examiner

*Primary Examiner* — Mansour Oveissi
(74) *Attorney, Agent, or Firm* — Harness, Dickey & Pierce, P.L.C.

(57) ABSTRACT

A communication device, which is capable of communicating through a first communication line and a second communication line different from one another, includes one or more processors configured to: communicate through the first communication line in a keeping state of data to be communicated; in a case where the second communication line is unavailable, limit a communication of the data through the first communication line corresponding to a movement of the communication device; and in response to the second communication line becoming available, communicate the data through the second communication line.

6 Claims, 7 Drawing Sheets

FIG. 7

COMMUNICATION DEVICE AND COMMUNICATION METHOD

CROSS REFERENCE TO RELATED APPLICATION

The present application claims the benefit of priority from Japanese Patent Application No. 2021-123357 filed on Jul. 28, 2021. The entire disclosure of the above application is incorporated herein by reference.

TECHNICAL HELD

The present disclosure relates to a communication device and a communication method.

BACKGROUND

There has been known a communication device which transmits data using an advantageous communication line estimated to be available at a specific position.

SUMMARY

A communication device, which is capable of communicating through a first communication line and a second communication line different from one another, includes one or more processors configured to: communicate through the first communication line in a keeping state of data to be communicated; in a case where the second communication line is unavailable, limit a communication of the data through the first communication line corresponding to a movement of the communication device; and in response to the second communication line becoming available, communicate the data through the second communication line.

BRIEF DESCRIPTION OF DRAWINGS

Objects, features and advantages of the present disclosure will become apparent from the following detailed description made with reference to the accompanying drawings. In the drawings.

DETAILED DESCRIPTION

Conventionally, a mobile system communication device that transmits data using an advantageous communication line available at an estimated position in the future is known. The estimated position is a position where the device arrives in the future. This communication device can transmit data under an advantageous communication characteristic, such as low cost while controlling an actual delay to be lower than a delay allowance value. The communication device selects, for communication purpose, a target communication line, from the currently available communication line and a communication line having more advantageous communication characteristic, based on an estimation result, which indicates whether the communication delay of the advantageous communication line available in the future can be controlled within the delay allowance value.

In the above-described device, when the line having advantageous communication characteristic is determined to be used, communication does not occur during a predetermined period before the start of communication using the line having advantageous communication characteristic. Therefore, during the above-described predetermined period, a packet of communication session of an application performed by the above-described device may be not forwarded by the communication line even though the application sends the packet. Thus, the device fails to confirm the delivery of the communication packet during the above-described predetermined period. The duration of delivery confirmation failure corresponds to the above-mentioned predetermined period. When the duration of delivery confirmation failure becomes longer than a session maintenance timeout period, the communication session becomes disconnected.

Figure 1:
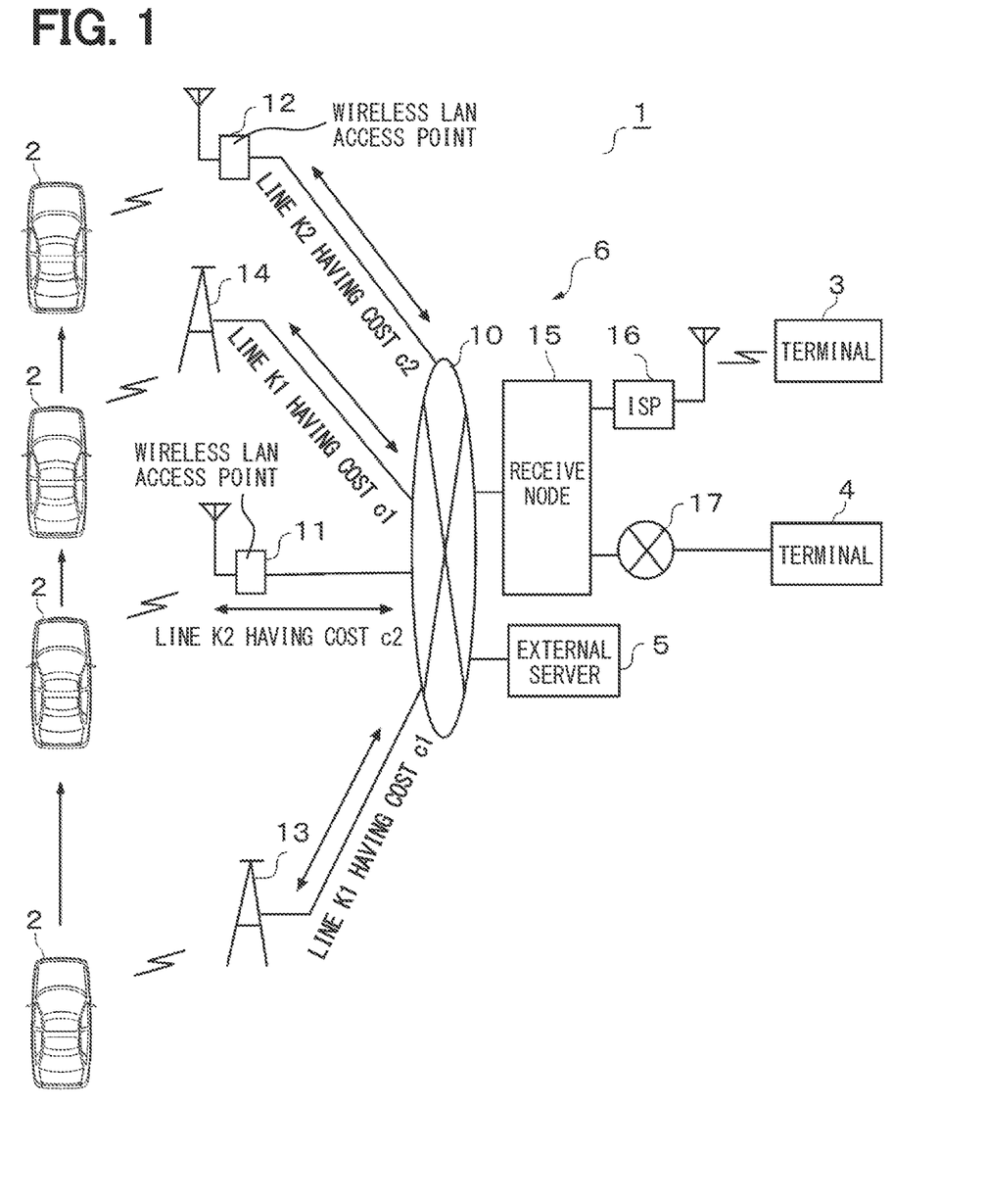
FIG. 1 is a diagram showing an overall configuration of an information communication system according to an embodiment of the present disclosure.

The following will describe embodiments of the present disclosure with reference to the accompanying drawings. As shown in FIG. 1, an information communication system 1 includes a vehicle 2, one or more terminals 3, 4, an external server 5, and a communication network 6 for communicating and connecting the vehicle 2, the terminals 3, 4, and the external server 5. The vehicle 2 may be a four-wheeled vehicle, a motorcycle, a bicycle, or the like.

Figure 2:
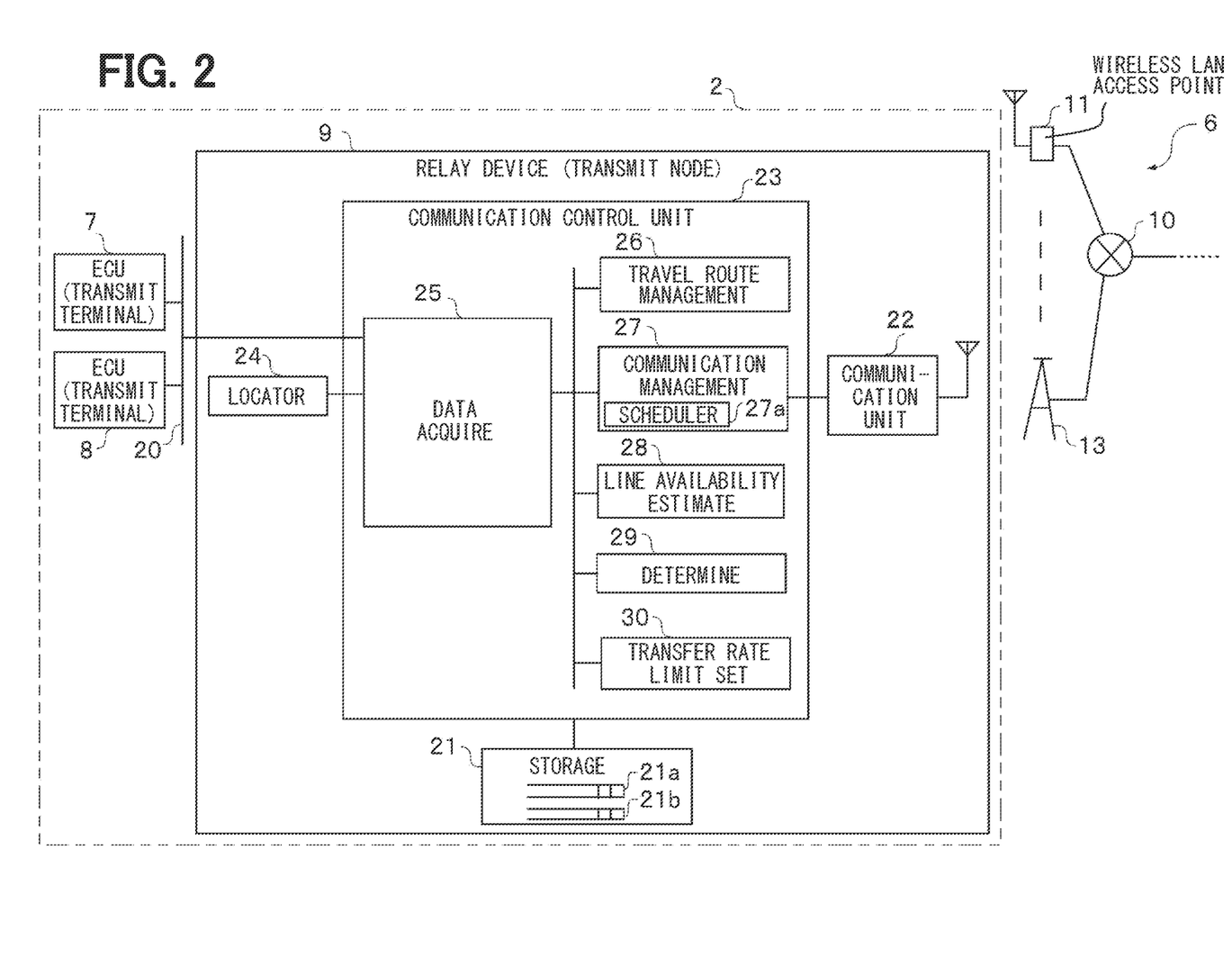
FIG. 2 is a block diagram schematically showing a configuration of an information communication device.

As shown in FIG. 2, the vehicle 2 includes one or more ECUs 7, 8 and a relay device 9 installed in the vehicle 2. The ECUs 7, 8 may be connected to a communication network 6 through the relay device 9, respectively. The ECU is an abbreviation for electronic control unit. The relay device 9 is also referred to as DCM or TCU, and is configured as an information communication device according to the present embodiment. Herein, DCM is an abbreviation for data communication module, and TCU is an abbreviation for telematics control unit. Each ECU 7. 8 communicates data with the terminals 3, 4 and the external server 5 through the relay device 9.

As shown in FIG. 1, the communication network 6 of the present embodiment constitutes an intermediate line constructed with an internet 10 as a main network. As shown in FIG. 1, the communication network 6 further includes one or more wireless LAN access points 11, 12, one or more wide area communication stations 13, 14 that enable wireless communication, a receiving node 15 that receives the packet from the relay device 9 through the wireless LAN access points 11, 12 or the wide area communication stations 13, 14, one or more ISPs 16, 17 that relay the packets transferred from the receiving node 15 to the terminals 3, 4. ISP is an abbreviation for internet service provider. The ECU 7, 8 shown in FIG. 2 can connect to the wide area communication station 13, 14 for communication purpose through the relay device 9, and can also connect to the wireless LAN access point 11, 12 for communication purpose. In the present embodiment, a cellular line K1 that communicates between (i) the ECU 7,8 and (ii) the terminal 3, 4 or the external server 5 via the wide area communication station 13, 14 is defined as a reference intermediate line. The relay device 9 communicates with the communication network 6 through an available communication section.

The wide area communication station 13, 14 shown in FIG. 1 includes a communication device for wireless communication connection with a mobile phone, a smartphone, a tablet, or the like. The wide area communication station 13, 14 has a relatively wide coverage area and covers a wide area around a position where the base station is installed. The communication device in the wide area communication station 13, 14 enables communication based on long term evolution (LTE), worldwide interoperability for microwave access (WiMAX), 5G, or the like. In the following description, an example in which the wide area communication station 13, 14 performs communication using the cellular line K1 based on LTE will be described. The cellular line K1 has a communication charge, that is, communication cost of c1.

An offload target area in which communication with the wireless LAN access point 11, 12 is available is narrower than a communicable area of the wide area communication station 13, 14. The wireless LAN access point 11, 12 is configured as a narrow area base station. The communication line using the wireless LAN access points 11, 12 is also referred to as a WLAN line K2.

The WLAN line K2 can communicate at a lower cost than the cellular line K1. In the following description, it is assumed that a communication charge, that is, a communication cost c2 (c2<c1) is required for the communication performed using the WLAN line K2. That is, from a vehicle user's point of view, the WLAN line K2 constitutes an advantageous intermediate line which is more advantageous in terms of communication cost than the communication cost of cellular line K1.

The following will describe a configuration example of the ECU 7, 8 and the relay device 9 mounted on the vehicle 2 with reference to FIG. 2. The ECUs 7, 8 and the relay device 9 are connected to with one another through an in-vehicle network 20, such as CAN and LIN. The ECUs 7, 8 and the relay device 9 are configured to enable data communication with one another. The relay device 9 includes a processor, a storage 21, a microcomputer equipped with I/O, and a communication circuit enabling a communication connection to the in-vehicle network 20. The storage 21 is provided by a non-transitory tangible storage medium, such as a ROM, RAM, flash memory, or the like.

The ECUs 7, 8 include a display system ECU that performs on-board meter display or warning display, a peripheral monitoring system ECU that monitors a periphery of the vehicle 2, a vehicle control system ECU that performs a vehicle control using a driving actuator to control movement or stop of the vehicle 2. The ECUs 7, 8 execute internal control of the vehicle 2. Each ECU 7, 8 includes a processor, a memory, a microcomputer equipped with I/O, and a communication circuit enabling communication connection to the in-vehicle network 20. None of these components of ECU is shown in the drawing.

In the present embodiment, in order to explain the operation when data is transmitted from the ECU 7, 8 to the terminal 3, 4 or the external server 5, the ECUs 7, 8 shown in FIG. 2 are described as transmitting terminals and the relay device 9 is described as a transmitting node.

The respective transmission data of ECU 7 and ECU 8 differ from one another depending on the application services to be executed. Each ECU 7, 8 may require a communication quality for the transmission data different from a communication quality of another ECU. Each ECU 7, 8 transmits the packet to the relay device 9 after defining the communication quality on a predetermined protocol stack. The packet transmitted at this time includes, for example, image data of a vehicle peripheral captured by a camera connected to the peripheral monitoring system ECU, image data captured by a vehicle inside camera, and various other data.

When the ECUs 7, 8 communicate in standard manner with the external terminals 3, 4 positioned outside of the vehicle 2 and the external server 5 through the relay device 9 and the internet 10, the packets are defined based on TCP/IP (Transmission Control Protocol/Internet Protocol) communication model. In order to provide a secret communication having a communication quality higher than that of a standard communication protocol, IPSec (Security Architecture for IP)-VPN may be defined in the network layer of layer 3, or TLS (Transport Layer Security) may be defined in fourth layer, that is, transport layer. VPN is an abbreviation of virtual private network. An allowable delay Ta may be included as the communication quality transmitted from the ECUs 7, 8 to the relay device 9.

Figure 3:
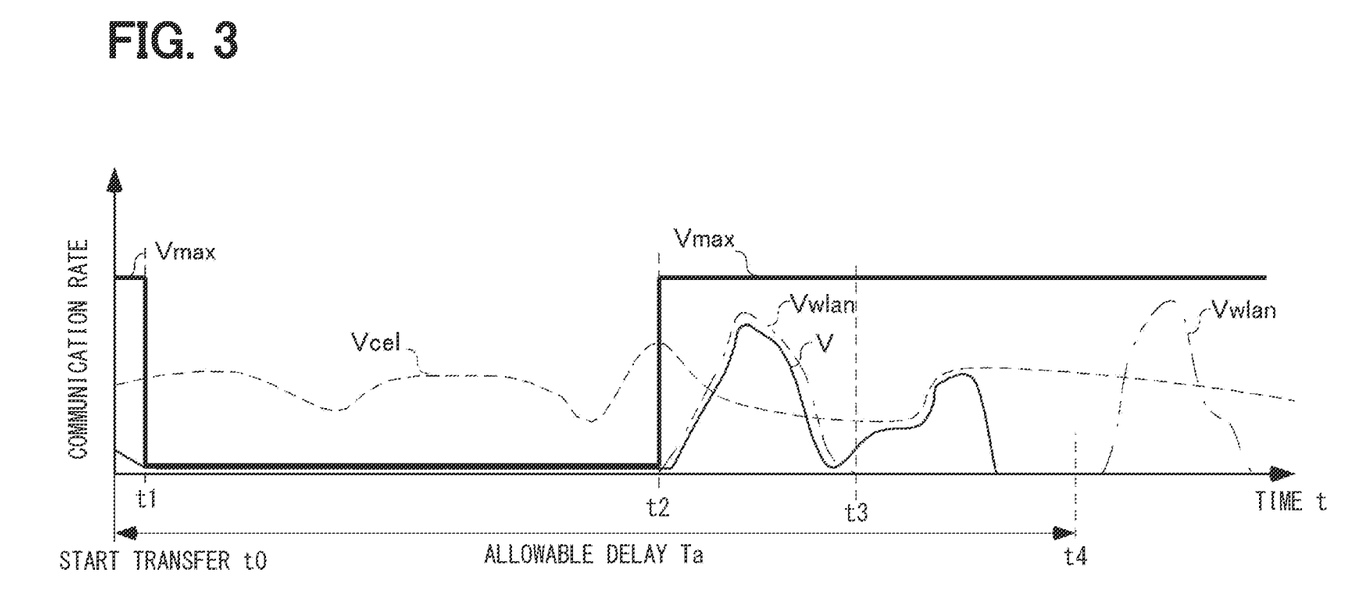
FIG. 3 is a diagram schematically showing a change in communication speed over time.

As shown in FIG. 3, the allowable delay Ta is an allowable delay duration until the data transfer is completed by the relay device 9. For example, since voice data of an application, such as a telephone call is required to be transmitted in real time, the allowable delay Ta is set to a relatively short duration. When an application of vehicle navigation transmits data of voice recognition request to a voice recognition cloud server, the allowable delay Ta is set to a relatively long duration.

The relay device 9 includes a communication unit 22, a communication control unit 23, a locator 24, a data acquiring unit 25, and a storage 21. These components are connected with one another. The storage 21 stores a program to be executed by a component of the relay device 9. The storage 21 includes a queue (not shown) that stores packet data acquired from the communication unit 22, and also includes one or more queues 21a, 21b that store packet data acquired by the data acquiring unit 25. The communication unit 22 has a communication function that enables wireless communication with the wide area communication station 13, 14, and also has a communication function that enables wireless communication with the wireless LAN access point 11, 12.

As information related to the use of the cellular line K1 and the WLAN line K2, a bandwidth limitation of available data communication and a transfer rate V are predetermined. The relay device 9 is able to use the bandwidth limitation of the data communication and the transfer rate V, which are stored, in advance, in the storage 21 together with the radio wave map of each line. Instead of using the bandwidth limitation of data communication and the transfer rate stored in the storage 21, the relay device 9 may acquire data of the radio wave map and the bandwidth limitation of data communication through the communication unit 22 from the external server 5 with which the communication is established.

By executing the program stored in the storage 21, the communication control unit 23 is implemented as the data acquiring unit 25, a traveling route management unit 26, a communication management unit 27, a line availability estimation unit 28, a determination unit 29, and a transfer rate limit setting unit 30.

The locator 24 is configured by a GNSS receiver, such as GPS and an inertial sensor (neither is shown) connected with one another, and sequentially acquires current position information of the vehicle 2. The locator 24 may be included in the peripheral monitoring system ECU 7, 8 disposed outside of the relay device 9. In the present embodiment, an example in which the locator is included in the relay device 9 will be described.

The data acquiring unit 25 is connected to the in-vehicle network 20. The data acquiring unit 25 acquires a packet including the communication quality transmitted from the ECU 7, 8 through the in-vehicle network 20, and stores the acquired packet in the queue 21*a*, 21*b*. The relay device 9 evaluates the packet stored in the queue 21*a*, 21*b* based on a value related to the allowable delay Ta, and may discard the packet when the value of the packet is evaluated to be zero.

The traveling route management unit 26 sequentially acquires the current position information from the locator 24, predicts a traveling possibility indicating the vehicle 2 will travel which route based on the current position acquired from the locator 24. The traveling route management unit 26 manages the traveling route by estimating an arrival time of vehicle at a predetermined passing point along the traveling route. The estimated arrival time indicates a time when the vehicle 2 is estimated to arrive at the passing point of the traveling route in a case where the vehicle 2 moves along the estimated traveling route. The estimated traveling route of the vehicle 2 is an estimated route along which the vehicle travels in the future from the current position of the vehicle.

As a simple method for estimating the passing point of the estimated traveling route, a point obtained by extending the traveling road, which is acquired by the locator 24, may be set as the passing point. A traveling possibility of the vehicle may be obtained based on the traveling history sequentially stored in the storage 21. The traveling route, which has the traveling possibility higher than a predetermined level, may be acquired, and a passing point of the acquired traveling route may be set as the passing point of the estimated traveling route. The passing point of the traveling route may be acquired based on a via point or a destination set by a navigation system mounted on the vehicle 2. The estimated traveling speed of the traveling route may be obtained by averaging traveling speeds of the routes that have been traveled by the vehicle so far. Alternatively, as the traveling speed of the vehicle 2, a legal speed limit of the traveling road or an average traveling speed included in probe information obtained by averaging large number of traveling speeds of vehicles which actually travelled the road may be used.

When there are multiple traveling routes, the traveling possibility of vehicle is determined for all of the traveling routes. That is, for each traveling route, estimated arrival time from the current position to the destination is estimated, and the estimated arrival time at the passing point of the traveling route is obtained. When the processing load is high, only for the traveling route having the traveling possibility higher than the predetermined level, the estimated arrival time at the passage point of the traveling route may be obtained. With this configuration, it is possible to obtain the estimated arrival time at the offload target area that can communicate through the wireless LAN access point 11, 12.

The communication management unit 27 includes a scheduler 27*a* that sets a communication order of transmission purpose packet data stored in the multiple queues 21*a*, 21*b* according to the priorities of packet data. The communication management unit 27 sets a communication resource and a communication path of an available communication line that can be used by the communication unit 22. As shown in FIG. 3, the communication management unit 27 manages a relationship between the estimated arrival time and a communication rate for each type of communication line.

The communication management unit 27 estimates and manages the communication rate at the passing point located along the estimated traveling route based on the installation positions of the wireless LAN access points 11, 12 and the positions of the wide area communication stations 13, 14. It is not required for the communication management unit 27 to always store the above-described relationship between the estimated arrival time and the communication rate. Alternatively, the communication management unit 27 may acquire the relationship by communicating with the external server 5 through the communication unit 22.

The communication management unit 27 may estimate the communication rate corresponding to the estimated arrival time at the passing point based on various parameters related to the passing point of the estimated traveling route along which the vehicle 2 travels. The parameters may include a time period of daytime, such as morning or afternoon, the day of the week, such as weekday or holiday, season, vehicle type, vehicle condition, type of ECU 7, 8, communication data type, type of the terminal 3, 4 or the external server 5, which corresponds to the communication partner, communication standard, or the like.

The communication management unit 27 estimates, as the communication quality, a transmission completion time at which transmission of the data stored in the queues 21*a* and 21*b* is estimated to be completed based on the estimated communication rate.

The line availability estimation unit 28 estimates an available bandwidth and a transfer rate V of the wide area communication station 13, 14 and an available bandwidth and a transfer rate V of the wireless LAN access point 11, 12 in the future. When the communication line currently being used is the cellular line K1 performing communication based on the wide area communication station 13, the line availability estimation unit 28 estimates whether the ALAN line K2, which is more advantageous than the cellular line K1, is available in the future. At this time, the line availability estimation unit 28 estimates the availability of the WLAN line K2 based on the derivation result of the traveling route management unit 26.

As described above, the traveling route management unit 26 estimates the arrival time at the passing point of the traveling route. The line availability estimation unit 28 refers to an installation map of the wide area communication stations 13, 14 and the wireless LAN access points 11,12, which is stored in the storage 21 in advance, matches the passing point of vehicle with the installation map, and estimates the arrival time and date at a communication area of the wide area communication station 13, 14 and the arrival time and date at an offload target area in which the communication with the wireless LAN access point 11, 12 is available.

When the current position of vehicle 2 is already within the offload target area in which the communicate with the wireless LAN access point 11, 12 is available and the WLAN line K2 is already used, the line availability estimation unit 28 has no need to estimate the available time of the WLAN line K2. In this case, the line availability estimation unit 28 may determine that all of the data communication is performed by using the WLAN line K2.

The determination unit 29 determines, based on attribute of each communication flow F1, F2 and estimation result by the line availability estimation unit 28, whether to limit the use of reference intermediate line by each communication flow F1, F2 or limit the bandwidth of transfer rate. The attribute of each communication flow F1, F2 is predetermined regardless of the selection of the intermediate line, such as an allowable delay Ta of each communication flow. The determination unit 29 changes a line selection control in consideration of the attribute of communication flow, thereby limiting the use of reference intermediate line and limiting the bandwidth of transfer rate.

For example, the determination unit 29 determines whether the communication line has a low cost, determines whether a security level is high based on a difference between a normal communication method and a secret communication method, determines whether the communication line has a high communication rate based on a difference in the communication modulation method, determines a use priority of the cellular line K1 and the WLAN line K2 in consideration of a remaining capacity of the communication capacity.

The present embodiment will describe an example in which the bandwidth limitation of the reference intermediate line is individually determined for each of two communication flows F1 and F2. Alternatively, for three or more communication flows, the bandwidth limitation of the reference intermediate line may be individually determined for each communication flow.

The advantageous communication line may be defined as a line that has a lower communication cost or has a higher security level compared with another communication line. In a case where the LTE is adopted as the cellular line K1, when the radio wave strength is strong, a modulation method supporting a high communication rate is adopted. Therefore, when the radio wave strength is stronger than a predetermined value, a communication line, which adopts the modulation method corresponding to the high radio wave strength, may be determined as the advantageous communication line. Alternatively, when the communication modulation method supporting a high transfer data rate can be adopted, the communication line adopting this communication modulation method may be determined as the advantageous communication line. When a remaining capacity obtained by subtracting an actual transfer rate V from a transfer rate limit set in advance is larger than a predetermined value, this communication line may be determined as the advantageous line. The determination of advantageous line may be performed in combined manner by setting priorities to the cellular line K1 and WLAN line K2 based on the attributes thereof.

When the determination unit 29 determines that the WLAN line K2 cannot be used after the vehicle arrives at the passing point, which is estimated to be included in the offload target area of the wireless LAN access point 11, 12, the priority of the WLAN line K2 is decreased, and the communication is performed by using the cellular line K1.

In a case where the cellular line K1 is currently being used, when the line availability estimation unit 28 estimates that the vehicle will travel a route which uses the WLAN line K2, the determination unit 29 compares an allowable delay Ta with the estimated arrival time taken by the vehicle to arrive at the point where the communication by the WLAN line K2 is available. Herein, the allowable delay Ta is a duration taken until a completion of the transmission data. In response to the allowable delay Ta being longer than the estimated arrival time, the determination unit determines to perform the packet communication using the WLAN line K2 as the advantageous communication line. In response to the allowable delay Ta being shorter than the estimated arrival time, the determination unit determines to perform the packet communication using the cellular line K1.

The transfer rate limit setting unit 30 sets a limit of the transfer rate V based on the estimation result by the line availability estimation unit 28, the determination result by the determination unit 29, and a timeout duration of the communication flow F1, F2. Herein, the timeout duration of the communication flow is the maximum communication response duration for maintaining the connection state of communication session. The transfer rate limit setting unit 30 may set the limit of the transfer rate V to an unlimited value, that is, an infinite value.

The transfer rate limit setting unit 30 may set the timeout duration based on the communication session related to the application executed by the ECU 7, 8, and set the lower limit of packet transfer rate V. The transfer rate limit setting unit 30 may store, in advance, the timeout duration for which the communication session used by the application executed by the ECU 7, 8 is required to be maintained, in the storage 21. Then, the transfer limit setting unit 30 may read the timeout duration from the storage 21, and maintain the communication session related to the communication flow F1, F2 for the set timeout duration.

In order to provide the communication quality of secret communication, for the packet input to the relay device 9, IPSec (Security Architecture for IF)-VPN may be defined in the network layer of layer 3, or security protocol header, such as TLS (Transport Layer Security) may be defined in fourth layer, that is, transport layer.

When the relay device 9 receives the packet, the timeout duration required when the communication security method is used may be set in consideration of a timeout duration for establishing a secret session. For example, when the timeout duration of handshake performed at the start of secret communication or the timeout duration required to maintain the secret session is shorter than the timeout duration defined in TOP session, the timeout duration required when the secret communication method is used may be set to be shorter than a timeout duration required to maintain a normal session related to a normal communication flow that does not adopt the secret communication method. By setting the timeout duration in described manner, the established communication session can be maintained even when the secret communication method is used.

Figure 4:
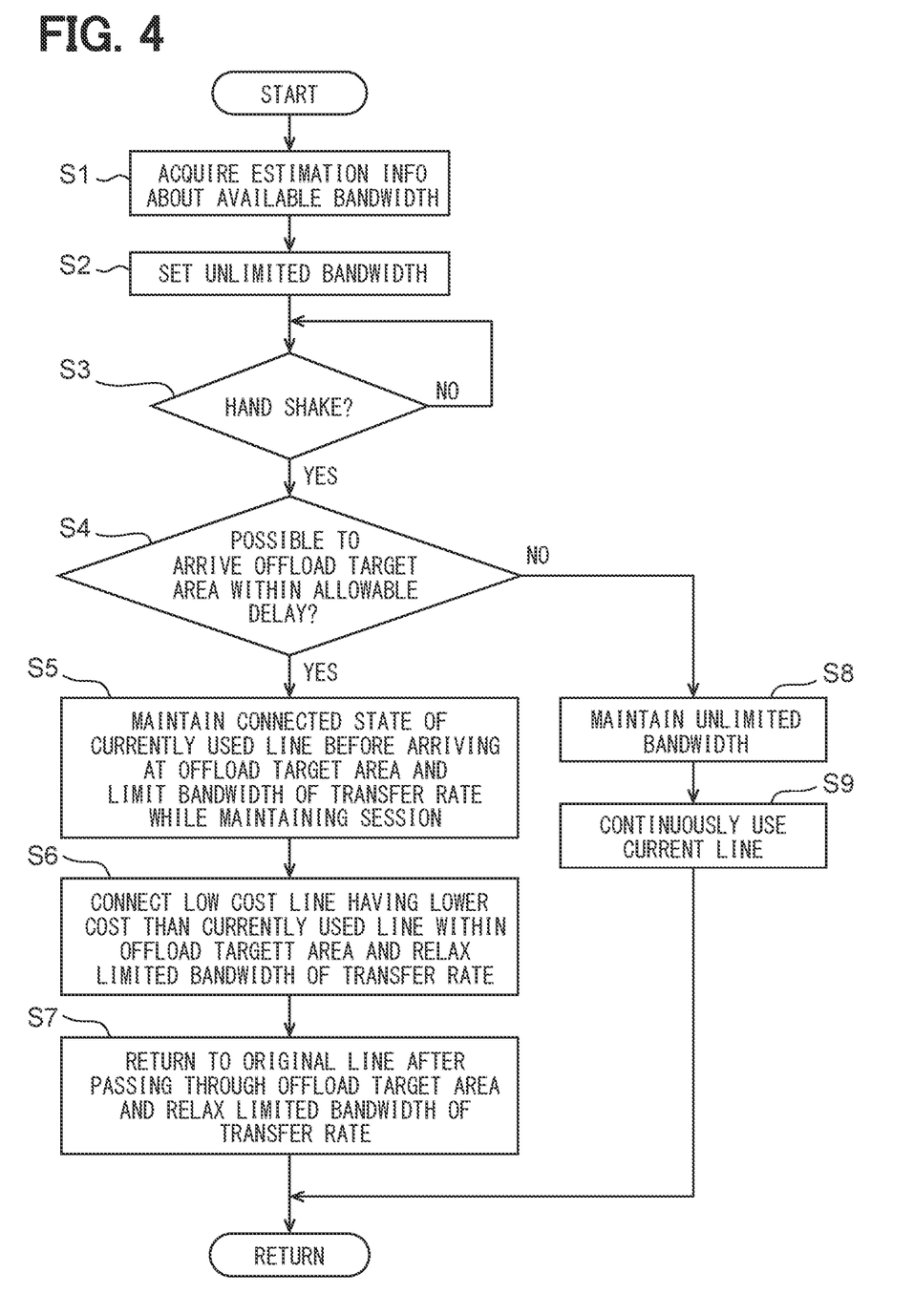
FIG. 4 is a flowchart showing a process executed by the information communication device.
Figure 5:
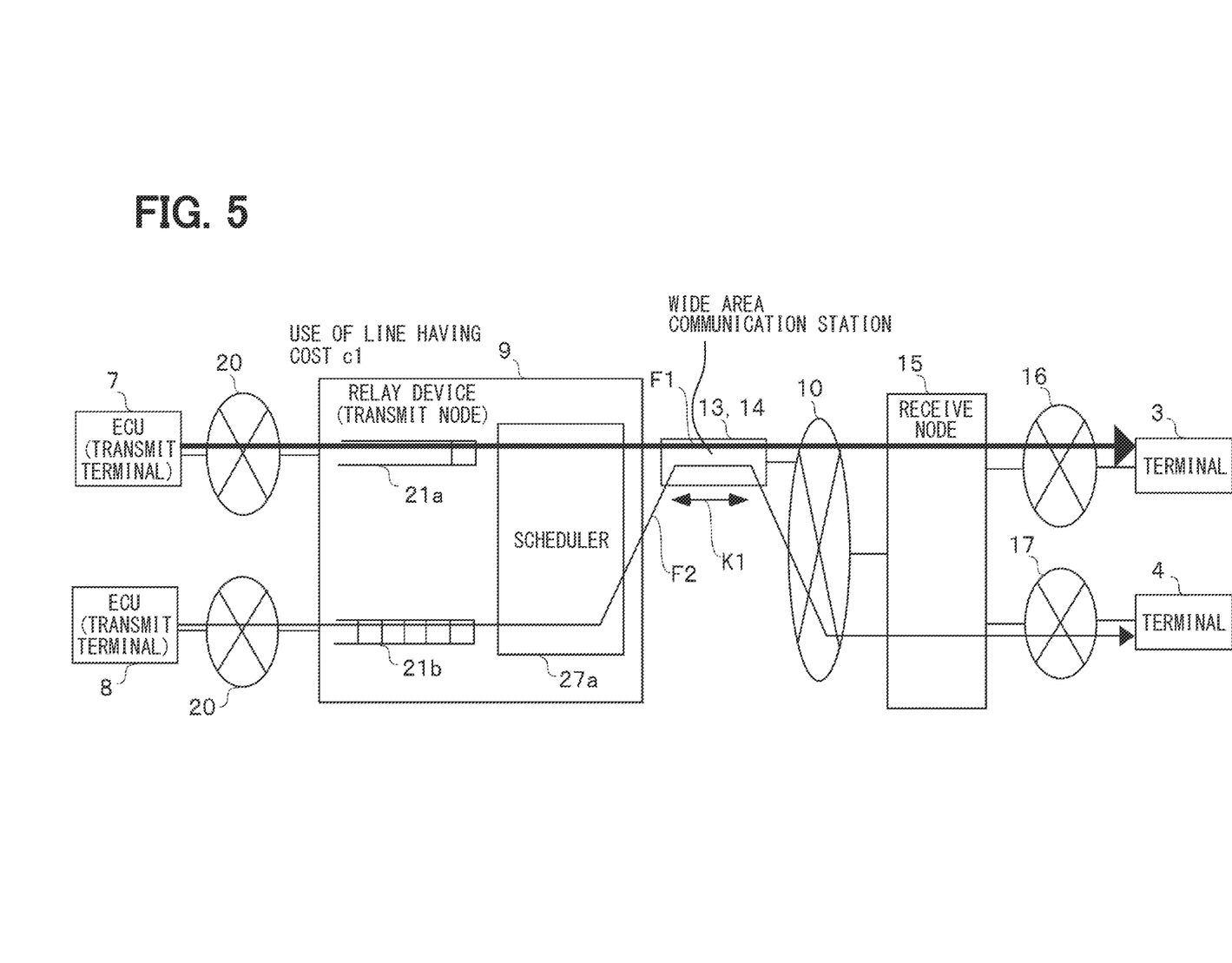
FIG. 5 is a diagram schematically showing a communication flow.
Figure 6:
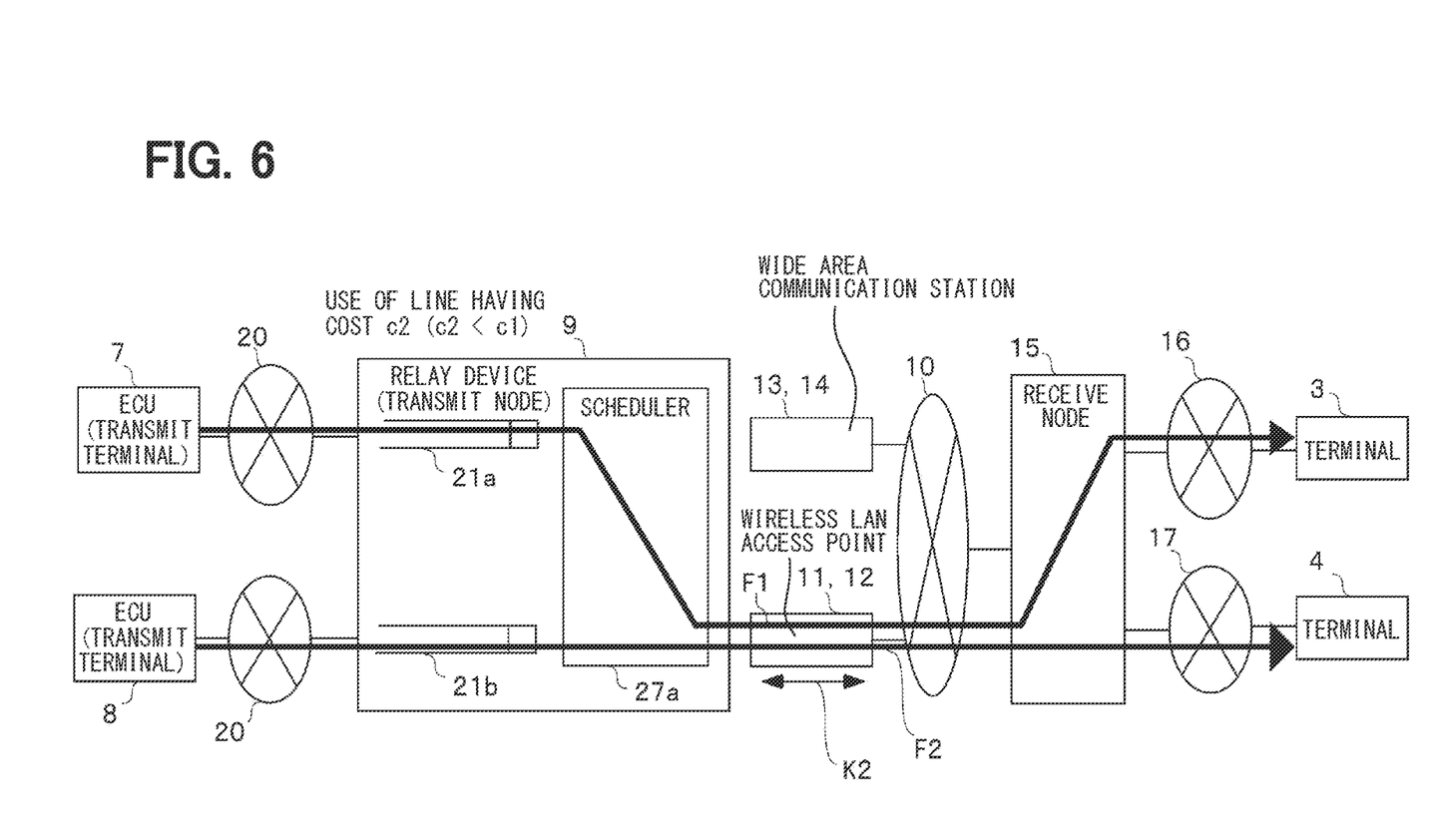
FIG. 6 is a diagram schematically showing a communication flow.

The following will describe an operation example of the communication system in chronological order with reference to FIG. 4 to FIG. 6. The process shown in FIG. 4 is executed for each of the communication flows F1, F2 shown in FIG. 5 and FIG. 6. The relay device 9 acquires the radio wave maps of the wireless LAN access points 11, 12 and the wide area communication stations 13, 14 around the vehicle 2 when the vehicle 2 equipped with the relay device is in traveling state. The traveling route management unit 26 of the relay device 9 sequentially acquires the current position information from the locator 24, and estimates the passing point of the traveling route of the vehicle 2.

The line availability estimation unit 28 refers to the installation area map of the wide area communication stations 13, 14 and the wireless LAN access points 11, 12, and successively acquires, in S1 of FIG. 4, estimation information related to the available bandwidth at the passing point scheduled to be traveled by the vehicle in the future.

When the application of ECU 7, 8 transmits a service request to the outside, the application transmits a packet, which specifies a destination IP address or a port number and the allowable delay Ta together with a data size, to the relay device 9. The allowable delay Ta is set for each application.

The relay device 9 selects, as the advantageous line, a communication line under a condition that the transfer of packet can be completed within the set allowable delay Ta and the available bandwidth has a maximum value while maintaining the communication session, or perform the bandwidth limit to the transfer data. The data transfer process is performed as follows.

When the relay device 9 has not established a communication with various communication stations such as the wide area communication station 13, 14 and the wireless LAN access point 11, 12, the bandwidth at the time of the first handshake is not limited, that is, an upper limit of bandwidth is deactivated. As shown in S2 of FIG. 4, the upper limit Vmax of bandwidth is set without any limitation, or the upper limit Vmax of bandwidth is set so as to exceed the upper limit of bandwidth of the cellular line K1 or the WLAN line K2 as shown in a period from a time point t0 to a time point t3 in FIG. 3.

As shown in FIG. 4, when the communication unit 22 performs handshake with the wide area communication station 13 in S3 (S3: YES), the process proceeds to S4 and data can be transferred through the cellular line K1. When the communication unit 22 performs handshake with the wide area communication station 13 in S3, the line availability estimation unit 28 of the relay device 9 estimates and determines, in 34, whether the vehicle is estimated to arrive at the offload target area of the wireless LAN access point 11 within the allowable delay Ta. When determining that the vehicle cannot arrive at the offload target area within the allowable delay Ta (S4: NO), the upper limit Vmax of bandwidth set in S2 is maintained in S8, and the communication line currently in use is continued to be used in S9.

When the line availability estimation unit 28 estimates that the vehicle can arrive at the offload target area by the time obtained by adding the transfer start time t0 of the packets other than the packet corresponding to the first handshake and the allowable delay Ta, the relay device 9 execute the process in S5 to S7 of FIG. 4. In S5, before arriving at the offload target area of the wireless LAN access point 11, connection of the currently used cellular line K1 is maintained, for example, the upper limit Vmax of bandwidth of the transfer rate V is limited so that the TCP|TLS communication session defined in fourth layer can be maintained as shown in a period from the time point t1 to a time point t2 in FIG. 3. Since the upper limit Vmax of bandwidth is limited to a rate higher than the minimum rate at which the TCP/TLS communication session can be maintained, the packets are transferred in small transfer units before the timeout duration of the re-connection of communication session elapses. With this configuration, the currently connected communication session can be maintained.

FIG. 5 shows two communication flows F1, F2 when transferring data through the cellular line K1. During the period from time point t1 to the time point t2 of FIG. 3, the communication flow F1 has a communication rate shown by a bold line as in FIG. 5, and the communication flow F2 has a communication rate shown by a thin line as in FIG. 5. In the communication flow F1, the allowable delay Ta is relatively short, and it is assumed that the allowable delay Ta will elapse before the vehicle arrives at the offload target area. At this time, the relay device 9 determines NO in S4 of FIG. 4. In response to determining NO in S4 of FIG. 4, the scheduler 27a maintains the use of the cellular line K1, which is currently in use, while maintaining the infinite upper limit of bandwidth in S8 and S9 of FIG. 4. Thus, during the period from time point t1 to time point t2, the communication rate of the currently used cellular line K1 in the communication flow F1 becomes relatively high. As a result, the accumulated amount of packet data in the queue 21a of the relay device 9, which is provided corresponding to the communication flow F1, is relatively small.

In the communication flow F2 shown in FIG. 5, the allowable delay Ta is relatively long, and the relay device 9 determines YES in S4 of FIG. 4. In the communication flow F2, it is assumed that the connection of the cellular line K1 currently in use is maintained after the time point t1. In this case, the scheduler 27a performs, only to the communication flow F2, bandwidth limitation of the transfer rate V at the time point t1 as shown in S5 of FIG. 4. As a result, a relatively large amount of packet data is accumulated in the queue 21b of the relay device 9, which is provided corresponding to the communication flow F2, When the vehicle 2 arrives at the offload target area of the wireless LAN access point 11 (shown in FIG. 1), the relay device 9 connects to the WLAN line K2 within the offload target area and relaxes the upper limit Vmax of bandwidth of the transfer rate V as shown in S6 of FIG. 4. The transfer rate limit setting unit 30 of the relay device 9 may deactivate the limitation set for the bandwidth upper limit Vmax of transfer rate V in the communication flow F2 that has been limited in the bandwidth, or may set the bandwidth upper limit Vmax of the transfer rate V to be equal to or higher than the maximum transfer rate of the WLAN line K2 as shown in a period from the time point t2 to a time point t3 in FIG.

The communication flows F1 and F2 during the period from the time point t2 to the time point t3 are shown in FIG. 6. The relay device 9 may set the transfer rate V according to the transfer rate Vwlan of the WLAN line K2, which is faster than the transfer rate Vcel of the cellular line K1, thereby accelerating the transfer rate V. The data can be transferred more cost-effectively by the WLAN line K2, compared with the data transfer using the cellular line K1. Since the communication rate of the WLAN line K2 is higher than the communication rate of LTE, the communication flow F1 can also use the WLAN line K2 instead of the cellular line K1. Thus, the data transfer in both of the communication flows F1 and F2 can be performed by using the WLAN line K2.

After the vehicle 2 passes through the offload target area of the wireless LAN access point 11 (shown in FIG. 1), the relay device 9 may return the connection to the cellular line K1 and continues the data transfer as shown in S7 of FIG. 4. For the returning to the originally connected communication line, refer to a time period from the time point t3 to a time point t4 shown in FIG. 3. In the process shown in FIG. 4, after executing S7 or S9, the process returns to S4 and determines whether the vehicle will arrive at the next offload target area within the allowable delay. For each of the communication flows F1 and F2, the transfer rate limit setting unit 30 of the relay device 9 relaxes limitation set to the bandwidth upper limit Vmax of the transfer rate V, or sets the bandwidth upper limit Vmax of the transfer rate V to be equal to or higher than the maximum transfer rate of the cellular line K1.

As shown in FIG. 3, when the data transfer cannot be completed by using only the WLAN line K2 from the transfer start time point t0 to the time point t4 corresponding to the elapse of allowable delay Ta, data transfer using the cellular line K1 is necessary.

(Modification)

Figure 7:
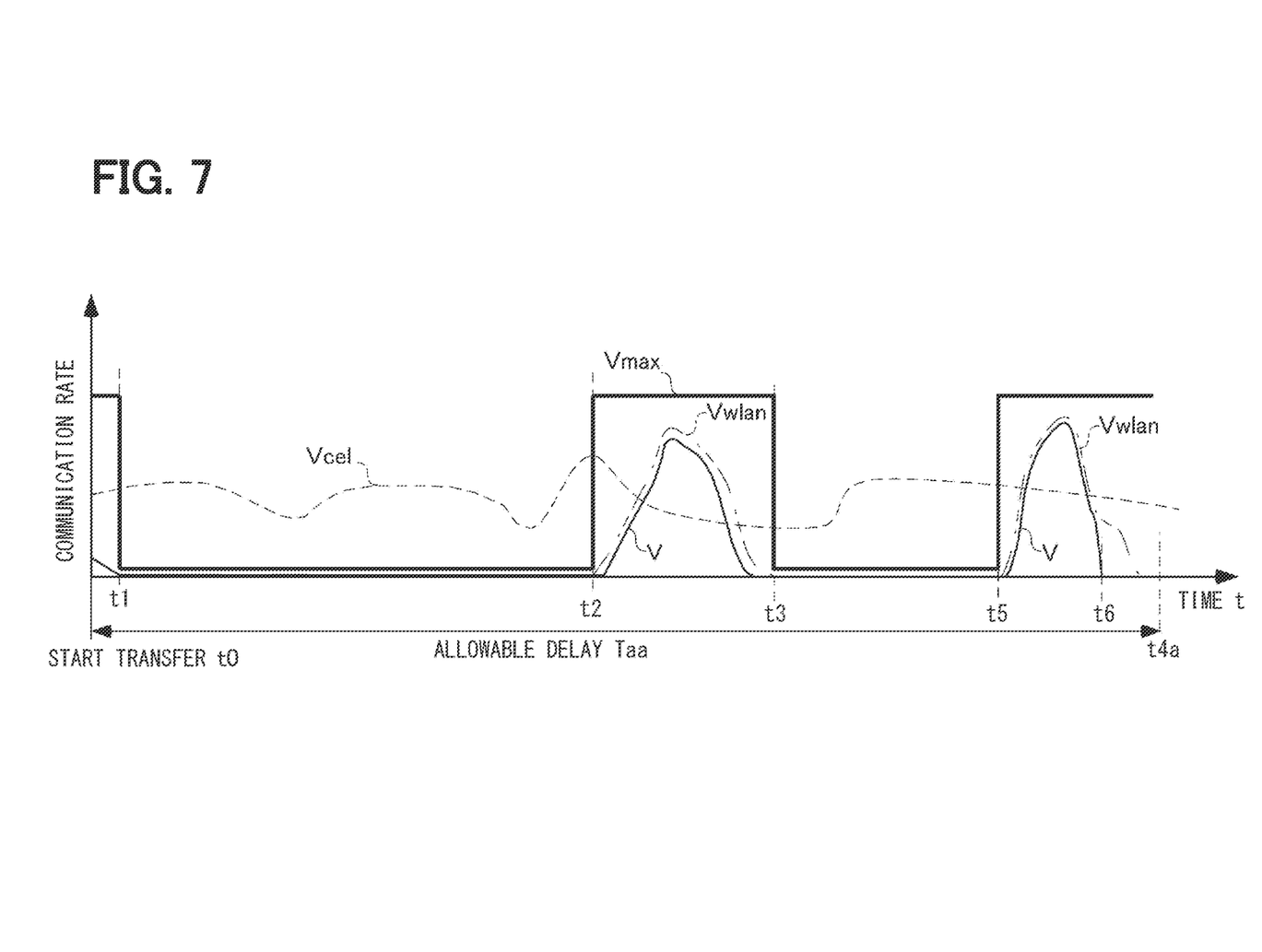
FIG. 7 is a diagram schematically showing a change in communication speed over time according to a modification of the present application.

The following will describe modifications of the present disclosure. After the end time of S7 in FIG. 4, that is, after passing the offload target area of the WLAN line K2 and returning to the original communication line, the relay device may further determine whether the vehicle is estimated to arrive at another offload target area within an allowable delay Taa shown in FIG. 7.

When the relay device estimates that the vehicle 2 will arrive at the offload target area of the wireless LAN access point 12 by the end of the allowable delay Tea, the bandwidth upper limit Vmax of the transfer rate V may be limited as shown in S5 of FIG. 4. After the vehicle arrives at the offload target area of the wireless LAN access point 12, the relay device may connect to the WLAN line K2 again to relax the bandwidth upper limit Vmax of the transfer rate V.

The line availability estimation unit 28 of relay device 9 estimates the availability of WLAN line K2 at the time point t0, and the relay device 9 transfers data based on the estimation result while actually passing through the communicable area of the wireless LAN access point 11. After that, when the relay device 9 further determines at the time point t3 that the vehicle will arrive at the offload target area within the allowable delay Taa, the relay device 9 connects to the cellular line K1 via the wide area communication station 14 shown in FIG. 1 and limits, by the transfer rate limit setting unit 30, the bandwidth upper limit Vmax to a level with which the connection of communication session can be maintained as shown in a period from the time point t3 to a time point t5 of FIG. 7. When the vehicle enters the communication range of wireless LAN access point 12 at the time point t5, the data transfer is performed by using the WLAN line K2. As a result, the data transfer can be completed before the elapse of allowable delay Taa.

In a case where the data transfer is estimated, at the time point to, to be completed using the WLAN line K2 before the elapse of the allowable delay Taa without using the cellular line K1, the relay device may connect to the WLAN line K2 by multiple times and perform the data transfer.

When the relay device 9 passes the offload target area at the time point t3 during execution of data transfer by the WLAN line K2 with the wireless LAN access point 11, the relay device may connect to the cellular line K1 and perform data transfer with the wide area communication station 14 shown in FIG. 1. In this case, the transfer rate limit setting unit 30 may limit the transfer rate V to a level with which the communication session can be maintained as shown in the period from the time point t3 to a time point t5 of FIG. 7.

The relay device 9 starts data transfer at the time point t5 through the WLAN line K2 with the next wireless LAN access point 12 shown in FIG. 1. The transfer rate limit setting unit 30 of the relay device 9 relaxes limitation set to the bandwidth upper limit Vmax of the transfer rate V, or sets the bandwidth upper limit Vmax of the transfer rate V to be equal to or higher than the maximum transfer rate of the cellular line K1. Since the relay device connects to the WLAN line K2 by multiple times, the data transfer can be completed by the end time point t4a of the allowable delay Taa.

(Overview)

According to the present disclosure, the transfer rate limit setting unit 30 limits, from the time point #1 to the time point t2, the transfer rate V of the currently connected cellular line K1 to a level under which the communication session of the communication flow F2 can be maintained until the WLAN line K2 is available at the time point t2. Thus, the communication session can be reliably maintained by using the cellular line K1 until the WLAN line K2 is available in the future. Then, the transfer rate limit setting unit 30 relaxes the limitation set to the transfer rate V when data transfer is performed by using the WLAN line K2 at the time point t2.

As a result, it is possible to increase the communication amount ratio of the WLAN line K2, which is particularly advantageous among the multiple lines that are available in the traveling route. The established communication session can be maintained even when the secret communication method is used, and the communication ratio of secret communication performed by the WLAN line K2 can be increased.

In the above-described embodiment, until the transfer rate limit setting unit starts using the advantageous intermediate line as the via line of the communication flow, the transfer rate of the communication flow is limited to a level under which the communication session using the currently connected reference intermediate line can be maintained. Thus, the communication session can be reliably maintained while limiting the communication amount of the currently connected reference intermediate line to a low level. The transfer rate limitation is relaxed when the advantageous intermediate line becomes available. Thus, the advantageous communication line can be used with the relaxed transfer rate limitation.

According to the above-described embodiment, the ratio of communication protected by the secret communication method can be increased by using the advantageous intermediate line, which has advantage in use of the secret communication method compared with the normal intermediate line.

Other Embodiments

The present disclosure should not be limited to the embodiments described above, and various modifications may further be implemented without departing from the spirit of the present disclosure. For example, the following modifications and extensions may be made.

The timeout duration of the protocol defined in a layer higher than the fourth layer may be included as a reference. For example, upper layer protocols, such as MQTT (Message Queueing Telemetry Transport), AMQP (Advanced Message Queuing Protocol), and CoAP (Constrained Application Protocol) are protocols having data delivery confirmation function and data retransmission function. The transfer rate V in the limiting period from the time point t1 to the time point t2 may be determined based on the shorter one of the retransmission timeout duration of the upper layer protocol and the timeout duration of TCF/TLS session defined in the fourth layer. When the protocol of the fourth layer is defined as UDP (User Datagram Protocol), the transfer rate V in the limiting period from the time point t1 to the time point t2 may be determined based on the retransmission timeout duration of the protocol defined in the upper layer.

When the upper layer protocol is provided with a keep alive function, the keep alive duration may be included as a reference. Upper layer protocols such as MQTT and HTTP (Hypertext Transfer Protocol) have a keep-alive function that maintains the session of the fourth layer when a subsequent packet is received within a certain period of time after receiving the current packet. The transfer rate V in the limiting period from the time point t1 to the time point t2 may be determined based on the shorter one of the keep-alive duration defined in the protocol of the upper layer and the timeout duration of TCP/TLS session of the fourth layer.

In the above-described embodiment, an example of the communication network 6 in which a network including the internet 10 is described. The present disclosure is not limited to this configuration. The communication network 6 may be a VPN communication network or an intranet constructed in a work environment or the like.

In the above embodiment, the processor is described as a hardware that executes the program stored in the storage 21, and configures the main component of the computer that performs the information transmission method according to the present disclosure. The processor includes at least one arithmetic core such as a central processing unit (CPU). A processing circuit including the processor may be configured mainly by FPGA (Field Programmable Gate Array) or ASIC (Application Specific Integrated Circuit).

The storage 21 may include a non-volatile storage medium. The storage medium may store various programs to executed by a corresponding processor. For example, the storage 21 is not limited to a configuration mounted on a circuit board, and may be configured by a memory card or the like, and is electrically connected to the communication control unit 23 by being inserted into a slot prepared for the memory card.

The relay device 9 and the method thereof described in the present disclosure may be implemented by one or more special-purpose computers or a computer program stored in the storage 21. Such computers may be created (i) by configuring (a) a memory and a processor programmed to execute one or more particular functions embodied in computer programs, or (ii) by configuring (b) a processor provided by one or more special purpose hardware logic circuits, or (iii) by configuring a combination of (a) a memory and a processor programmed to execute one or more particular functions embodied in computer programs and (b) a processor provided by one or more special purpose hardware logic circuits. The computer program may be stored in the storage 21 as an instruction executed by a computer, and the storage 21 may be a computer-readable non-transitory tangible storage medium. Alternatively, the relay device 9 and the method thereof described in the present disclosure may be implemented by a dedicated computer mainly including a processor configured by one or more dedicated hardware logic circuits. Alternatively, the relay device 9 and the method thereof described in the present disclosure may be implemented using one or more dedicated computers including a combination of the processor and a memory of the storage 21 programmed to execute one or more functions and the processor with one or more hardware logic circuits. The computer program may be stored, as instructions to be executed by a computer, in a computer-readable non-transitory tangible storage medium.

Although the present disclosure has been described in accordance with the above embodiment, it is understood that the present invention is not limited to the described embodiment or configuration. The present disclosure includes various modifications and variations within the scope of equivalents. In addition, various combinations and forms, as well as other combinations and forms including only one element, more than that, or less than that, are also within the scope and idea of the present invention.

What is claimed is:

1. A communication device, which performs a communication in a communication section through multiple different communication lines, the multiple different communication lines including a first communication line and a second communication line,
the communication device comprising:
a traveling route management unit obtaining an estimated arrival time at a predetermined point on a predetermined traveling route of the communication device;
a line availability estimation unit estimating, based on a result obtained by the traveling route management unit, an availability of the second communication line, the second communication line having an attribute different from an attribute of the first communication line;
a determination unit determining whether to limit a bandwidth of a transfer rate of the first communication line based on (i) an attribute of a first communication flow in the first communication line and an attribute of a second communication flow in the second communication line, and (ii) an estimation result estimated by the line availability estimation unit; and
a transfer rate limit setting unit limiting the bandwidth of the transfer rate of the first communication line under a condition that a communication session established by the currently used first communication line can be maintained until the communication through the second communication line starts based on (i) the estimation result estimated by the line availability estimation unit, (ii) a determination result determined by the determination unit, and (iii) a timeout duration indicating a maximum response duration in which the communication session related to the first communication flow is maintained,
wherein the transfer rate limit setting unit relaxes the bandwidth of the transfer rate, which has been limited, in response to the communication through the second communication line being started.

2. The communication device according to claim 1, wherein
the second communication line has a lower communication cost than a communication cost of the first communication line.

3. The communication device according to claim 1, wherein
the second communication line uses a secret communication method having a higher security than a security of the first communication line.

4. The communication device according to claim 1, wherein
the communication session is a transmission control protocol/transport layer security (TCP/TLS) session defined in a fourth layer of communication model,
an upper layer higher than the fourth layer performs a communication using a protocol, which has a data delivery confirmation function and a data retransmission function, and
the transfer rate limit setting unit sets the bandwidth of the transfer rate, within a limiting period, based on a shorter duration selected from (i) a retransmission timeout duration defined by the protocol of the upper layer and (ii) a timeout duration of the TCP/TLS session defined in the fourth layer.

5. The communication device according to claim 1, wherein
the communication session is a user datagram protocol (UDP) session defined in a fourth layer of communication model,
an upper layer higher than the fourth layer performs a communication using a protocol, which has a data delivery confirmation function and a data retransmission function, and
the transfer rate limit setting unit sets the bandwidth of the transfer rate, within a limiting period, based on a retransmission timeout duration defined by the protocol of the upper layer.

6. The communication device according to claim 1, wherein
- the communication session is a transmission control protocol/transport layer security (TCP/TLS) session defined in a fourth layer of communication model,
- an upper layer higher than the fourth layer has a protocol that defines a keep alive function,
- the keep alive function maintains the TCP/TLS session of the fourth layer when a subsequent packet is received within a certain time period after receiving a current packet, and
- the transfer rate limit setting unit sets the bandwidth of the transfer rate, within a limiting period, based on a shorter duration selected from (i) a keep alive duration defined in the protocol of the upper layer and (i) a timeout duration of the TCP/TLS session defined in the fourth layer.

* * * * *